United States Patent
Alakontiola (10) Patent No.: US 8,131,278 B2
(45) Date of Patent: Mar. 6, 2012

(54) METHOD, APPARATUS, AND COMPUTER PROGRAM PRODUCT FOR APPLICATION-BASED COMMUNICATIONS

(75) Inventor: Jukka Alakontiola, Oulu (FI)

(73) Assignee: Nokia Corporation, Espoo (FI)

( * ) Notice: Subject to any disclaimer, the term of this patent is extended or adjusted under 35 U.S.C. 154(b) by 614 days.

(21) Appl. No.: 12/329,243

(22) Filed: Dec. 5, 2008

(65) Prior Publication Data

US 2010/0144377 A1    Jun. 10, 2010

(51) Int. Cl.
*H04W 88/02* (2009.01)

(52) U.S. Cl. ............................................ 455/417

(58) Field of Classification Search .......... 455/417, 455/422.1, 432.3, 433, 435.1, 456.1, 461, 455/466, 558; 370/328, 349; 709/224, 225
See application file for complete search history.

(56) References Cited

U.S. PATENT DOCUMENTS

| | | |
|---|---|---|
| 6,188,909 B1 | 2/2001 | Alanara et al. |
| 6,292,668 B1 | 9/2001 | Alanara et al. |
| 6,370,389 B1 | 4/2002 | Isomursu et al. |
| 2002/0162038 A1 | 10/2002 | Bullman et al. |
| 2004/0128310 A1 | 7/2004 | Zmudzinski et al. |
| 2006/0075269 A1 | 4/2006 | Liong et al. |
| 2007/0254636 A1* | 11/2007 | Jiang .................... 455/414.1 |
| 2008/0026845 A1 | 1/2008 | Aguilar et al. |
| 2008/0134052 A1* | 6/2008 | Davis et al. ................ 715/744 |
| 2010/0027469 A1* | 2/2010 | Gurajala et al. ............. 370/328 |

FOREIGN PATENT DOCUMENTS

JP    2002-224455    8/2002

* cited by examiner

*Primary Examiner* — Diane Mizrahi
(74) *Attorney, Agent, or Firm* — Ditthavong Mori & Steiner, P.C.

(57) ABSTRACT

An apparatus for application-based communications may include a processor. The processor may be configured to receive a message from a remote device at a receiving device. The message may have been generated based on application registration data associated with the receiving device. The processor may also be configured to execute an application based on content included in the message. Associated methods and computer program products may also be provided.

20 Claims, 4 Drawing Sheets

METHOD, APPARATUS, AND COMPUTER
PROGRAM PRODUCT FOR
APPLICATION-BASED COMMUNICATIONS

TECHNICAL FIELD

Embodiments of the present invention relate generally to communication of data, and, more particularly, relate to a method, apparatus, and a computer program product for application-based communications.

BACKGROUND

The modern communications era has brought about a tremendous expansion of wireline and wireless networks. Various types of networking technologies have been developed resulting in unprecedented expansion of computer networks, television networks, telephony networks, and the like, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile communication devices and other computing devices. However, as the ease of information transfer increases, users and businesses continue to demand more functionality from communications devices, particularly mobile communications devices.

The consumer demands have given rise to business opportunities and, as a result, many businesses are providing new and improved services to mobile communication devices, such as social networking services. These services provided for the transfer of information from one user to another user such as in a chat/instant message application. Further, large files, such as, for example, photos and/or videos may also be transferred between users of these services.

As such, implementation of these services can sometimes require a data connection to be open between mobile communications devices or between a mobile communications device the service. In some instances, the open data connection may be needed merely to initiate a communications session (e.g., a chat session). Maintaining the open data connection from the client side (e.g., mobile communications device side) can often be financially costly for the party that opened the connection and costly with respect to the inefficient usage of bandwidth on the system. Further, many conventional systems may not allow a data connection to be opened by the server side device (e.g., a service), or opening a data connection by the server side device may be financially costly to the party operating the server side device.

BRIEF SUMMARY

A method, apparatus, and computer program product are described for application-based communications. In this regard, communications between communications devices may be implemented in a manner that limits or eliminates the involvement of a service. By limiting or eliminating the involvement of the service for particular communications, the service may incur less costs for bandwidth or traffic, and in some embodiments, those costs may be shifted to the users of the service. For example, the cost for short message service (SMS) messages associated with the functionality of the service may be borne by the user. Having the costs of the communication be borne by an initiator of the message, rather than the service, may tend to discourage nefarious use of the communication capabilities of the service and act as an anti-spam mechanism.

In some exemplary embodiments, messages, such as, for example, SMS messages, may be received at a receiving device from a remote device. The message may have been generated, for example, at the remote communications device, and the message may have been generated based upon application registration data associated with the receiving device. In this manner, the remote device may verify that the receiving device has been configured to properly receive the message prior to generation and transfer of the message. The involvement of a service, in this regard, need not be required. Having been preconfigured to receive and evaluate the content of the message, the receiving device may execute an application based on content of the message.

In various exemplary embodiments, security mechanisms may be included in the messages. For example, a device identifier within the message may be compared with device identifiers stored in a memory device of the receiving device. The device identifiers may be, for example, mobile subscriber integrated services digital network (MSISDN) numbers, jabber identifications (JIDs), or the like. The device identifiers may be used to verify the identity of the remote device and ignore or discard the messages from unidentified senders.

Accordingly, in one exemplary embodiment, a method for application-based communications is described. The method may include receiving a message from a remote device at a receiving device. The message may have been generated based on application registration data associated with the receiving device. The method may also include executing an application based on content included in the message. In some exemplary embodiments, the message received at the receiving device may be a short message service (SMS) message.

In another exemplary embodiment, an apparatus for application-based communications is described. The apparatus may include a processor. The processor may be configured to receive a message from a remote device at a receiving device. The message may have been generated based on application registration data associated with the receiving device. The processor may also be configured to execute an application based on content included in the message. In some exemplary embodiments, the message received at the receiving device may be a short message service (SMS) message.

In another exemplary embodiment, a computer program product for identifying techniques for solving functions is described. The computer program product may include at least one computer-readable storage medium having computer-readable program code instructions stored therein. The computer-readable program code instructions may be configured to receive a message from a remote device at a receiving device. The message may have been generated based on application registration data associated with the receiving device. The computer-readable program code instructions may also be configured to execute an application based on content included in the message. In some exemplary embodiments, the message received at the receiving device may be a short message service (SMS) message.

In yet another exemplary embodiment, an apparatus for application-based communications is described. The apparatus may include means for receiving a message from a remote device at a receiving device. The message may have been generated based on application registration data associated with the receiving device. The apparatus may also include means for executing an application based on content included in the message. In some exemplary embodiments, the message received at the receiving device may be a short message service (SMS) message.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

Figure 1:
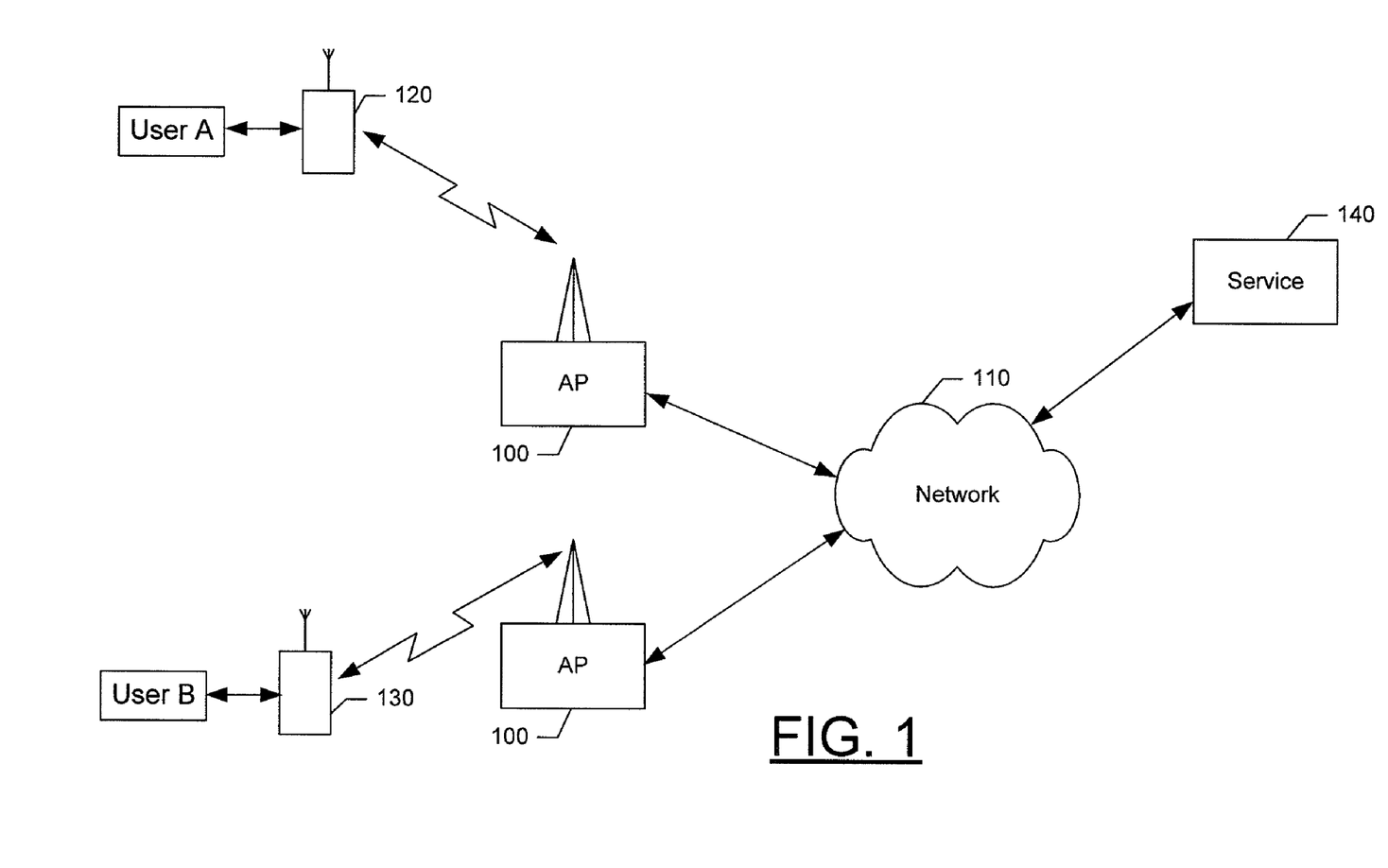
FIG. 1 is a schematic block diagram of a system for application-based communications according to various exemplary embodiments of the present invention.

FIG. 1 illustrates an exemplary system of network entities for application-based communications according to various embodiments of the present invention. The system of FIG. 1 includes mobile terminals 120 and 130, access points 100, network 110, and service 140. While the exemplary embodiment of FIG. 1 employs a wireless communication system with mobile terminals 120 and 130, various other exemplary embodiments of the present invention are contemplated that may employ wired communications devices as further described below.

The mobile terminals 120 and 130 may be capable of communicating with each other, the network 110, and entities connected to the network 110, such as the service 140. The mobile terminals 120 and 130 may communicate with various entities via the access points 100. In some exemplary embodiments, mobile terminals 120 and 130 may also be configured to send and receive communications directly to/from each other, without routing the communications through the access points 100.

Further, the mobile terminals 120 and 130 may be associated with a device identifier that may be unique to the respective mobile terminal. In this regard, each mobile terminal may be associated with a device identifier that may be a phone number, a mobile subscriber integrated services digital network (MSISDN) number, a jabber identification (JID), international mobile equipment identity (IMEI), Bluetooth media access control (BT MAC), wireless local area network media access control (WLAN MAC), or the like.

The access points 100 may be configured to provide a communication link between the mobile terminals 120 and 130, or between the mobile terminals 120 and/or 130 and the network 110. Depending on various criteria, such as the location of the mobile terminals 120 and 130, the mobile terminals may communicate via the same access point 100 or via separate access points 100. The access points 100 may be configured to send or receive communications via any known technique. In some exemplary embodiments, the access points 100 may be base stations of a cellular communication system.

The service 140 may be a computing device, such as a web server, that may facilitate the implementation of service functionality on mobile terminals. In some exemplary embodiments, the service 140 may facilitate the implementation of client applications on mobile terminals. The client applications of the service may conduct communications between mobile terminals in accordance with the service functionality. In some exemplary embodiments, the communications conducted by the client applications may be internet protocol (IP) based communications. Further, the communications may be textual communications, such as textual communications conducted in a chat or instant message type application.

To implement the functionality of the service, users of mobile terminals may first need to register with the service 140. Registration may involve the transfer of information to the service 140, such as the device identifier of the mobile terminal associated with the user. Registration may also involve downloading a client application to the mobile terminal. By providing information, such as the device identifier, to the service 140, the service 140 may be able to log and track the mobile terminals that are configured with the client application and are thereby configured implement the functionality of the service 140.

In some exemplary embodiments, users of the service 140 may also define a social group. The social group may include individuals that the users may wish to communicate with via the service functionality. The social group may comprise a buddy list or a friends list. In some exemplary embodiments, when an individual is added to the social group, the mobile terminal may retrieve the device identifier of the mobile terminal associated with the added individual (e.g., from the service 140) and store the device identifier in the memory of the mobile terminal. The presence of the device identifier or other application registration data of another mobile terminal in the memory can indicate that the other mobile terminal is configured with the client application of the service 140. As such, the presence of the device identifier or other application registration data can provide a level of assurance that application-based communications between the devices will be properly received and acted upon.

In some exemplary embodiments, users of the service 140 may be required to log on to, or be online prior to conducting communications between users of the service 140. Exemplary embodiments of the present invention may facilitate bringing a currently offline user to an online status and opening a communication session via the client application associated with the service 140.

Figure 2A:
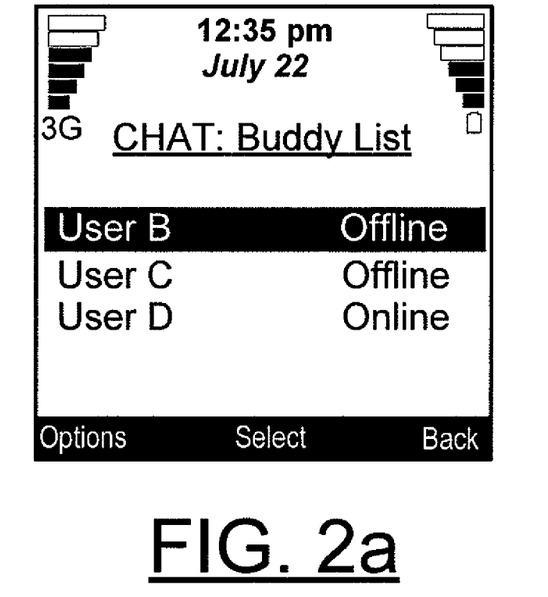
FIGS. 2a-2b are illustrations of screen shots of a user interface according to various exemplary embodiments of the present invention.

In some exemplary embodiments, the service 140 may monitor the status (e.g., online, offline, etc.) of mobile terminals that are configured to utilize the service. Further, the service 140 may broadcast the statuses of the mobile terminals configured to utilize the service, or otherwise make status information available for access by mobile terminals. In some exemplary embodiments, the user interface of a client application may be modified based on the statuses of mobile terminals. FIG. 2a illustrates an example screen shot of a user interface that may be modified based on the status (e.g., online or offline) of mobile terminals.

Figure 2B:
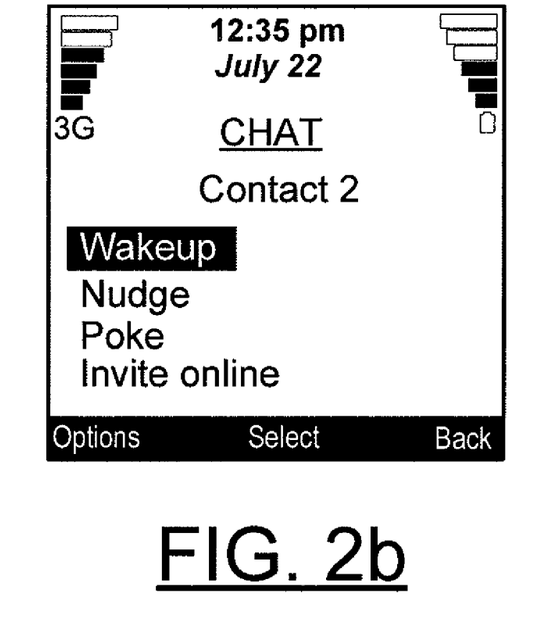

In this regard, a mobile terminal that is currently online (e.g., mobile terminal 120) may be configured to send a message, such as a specially configured SMS message, to an offline mobile terminal (e.g., mobile terminal 130) requesting that the offline mobile terminal go online. In some exemplary embodiments, the route of the message to the offline communications device need not pass through the service 140. An example screen shot of a user interface that may be used to initiate a message is illustrated in FIG. 2b. The online mobile terminal may include a predefined port address and/or the device identifier of the online mobile terminal in the message.

The offline mobile terminal may be configured to receive the message from the online mobile terminal. The message may be received at the predefined port and the content of the message may be evaluated and used to execute an application that is part of or associated with the client application. For example, the offline mobile terminal may be configured to execute an application that automatically logs on the mobile terminal and prepares the device for communications. The offline mobile terminal may receive the specially configures SMS message, and, in response, open a communications connection, such as an internet protocol based connection. According to various exemplary embodiments, the manner in which the receiving device responds to the message may be user defined. For example, messages received from particular members of the social group may automatically put the mobile terminal online, while messages from other members may require an acknowledgement or activation request before going online. In an exemplary embodiment where an acknowledgement or activation request is implemented, a user interface may display "User A wants to chat with you. Do you want to log in to the service Y/N?"

In exemplary embodiments where a specially configured SMS message is used, the client application may configure the mobile terminal to receive the specially configured SMS message and identify a port address for the message. The message may then be passed to the identified port address associated with the client application of the service 140. Since the specially configured SMS message may be received at the port associated with the client application, the SMS message need not appear in the standard SMS inbox of the mobile terminal and the user need not be otherwise made aware that the SMS message has been received.

Further, the example provided above is only one example of a message being used to implement an application or other functionality on another mobile terminal. In some other exemplary embodiments, other applications or functionality may be implemented in response to receiving the message. FIG. 2b illustrates a screen shot of a user interface that may provide for generating messages for implementing other functionality on a receiving device (e.g., wake up, nudge, poke, and invite online). In some exemplary embodiments, the message may be sent in response to the statuses of the mobile terminals. For example, in some scenarios, no message may be sent to invite an individual to go online if the individual is already online. Further, messages may be sent to initiate an automatic context check of the receiving device. Further, messages may also initiate a log off of the mobile terminal receiving the message.

Additionally, in some exemplary embodiments, the mobile terminal receiving the message may be configured to verify the identity of the mobile terminal sending the message. In this regard, the receiving device may compare a device identifier in the message with a device identifier associated with an individual in the receiving device's social group. In some exemplary embodiments, if the device identifier in the message matches a device identifier associated with a member of the social group, an application or other functionality may be executed. Further, if the device identifier in the message does not match a device identifier associated with a member of the social group, the message may be ignored and/or discarded.

Figure 3:
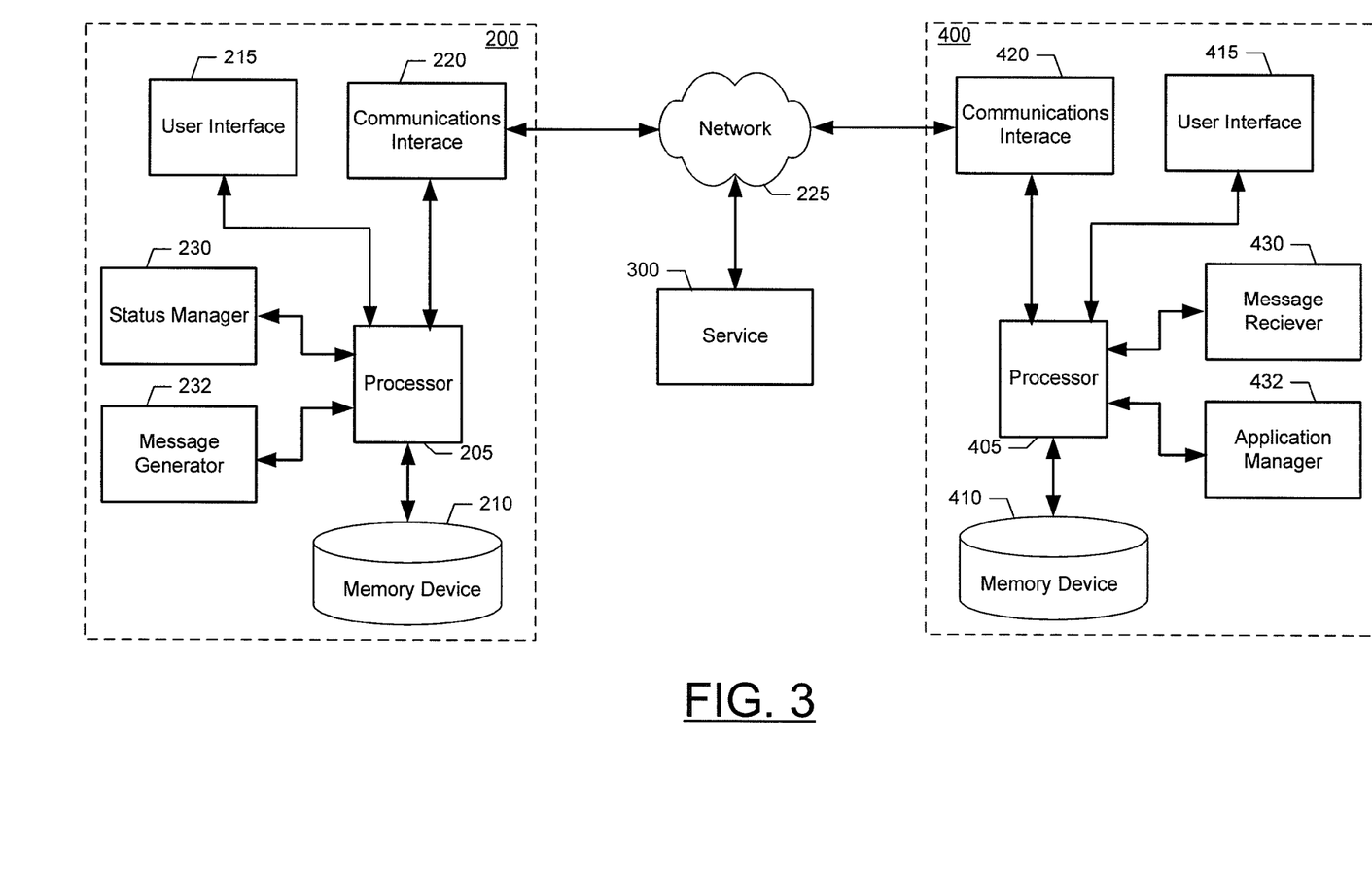
FIG. 3 is a schematic block diagram of a system for application-based communications including apparatuses configured for application-based communications according to various exemplary embodiments of the present invention.

FIG. 3 illustrates another exemplary system including apparatuses 200 and 400 for implementing application-based communications. In various exemplary embodiments, the apparatuses 200 and 400 may be configured to perform some or all of the functionality of the mobile terminals 120 and/or 130 described above. Also, apparatus 200 of FIG. 3 is configured to implement functionality of a communications device that sends a message, and apparatus 400 of FIG. 3 is configured to implement functionality of a communications device that receives a message. However, exemplary embodiments of the present invention are contemplated where a single apparatus may be configured to both send and receive a message. Further, the service 300 may be configured to perform some or all of the functionality of the service 140 described above.

The apparatus 200 of FIG. 3 may be configured to implement application-based communications according to various exemplary embodiments of the present invention. In particular, the apparatus 200 may be configured to generate and transmit a message as describe herein. In some exemplary embodiments, the apparatus 200 may be embodied as, or included as a component of, a communications device with wired or wireless communications capabilities. Some examples of the apparatus 200 may include a computer, a server, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the apparatus 200 may be configured to implement various aspects of the present invention as described herein including, for example, various exemplary methods of the present invention, where the methods may be implemented by means of a hardware or software configured processor, computer-readable medium, or the like.

The apparatus 200 may include or otherwise be in communication with a processor 205, a memory device 210, a user interface 215, and a communication interface 220. The processor 205 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. In an exemplary embodiment, the processor 205 may be configured to execute instructions stored in the memory device 210 or instructions otherwise accessible to the processor 205. Processor 205 may also be configured to facilitate communications via the communications interface 220 by, for example, controlling hardware and/or software included in the communications interface 220.

The memory device 210 may be a computer-readable storage medium that may include volatile and/or non-volatile memory. For example, memory device 210 may include Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

The user interface 215 may be in communication with the processor 205 to receive user input at the user interface 215 and/or to provide output to a user as, for example, audible, visual, mechanical or other output indications. The user interface 215 may include, for example, a keyboard, a mouse, a joystick, a display (e.g., a touch screen display), a microphone, a speaker, or other input/output mechanisms. In some exemplary embodiments, the user interface 215 may be limited, or even eliminated.

Further, the memory device 210 may be configured to store information, data, applications, computer-readable program code instructions, or the like for enabling the processor 205 and the apparatus 200 to carry out various functions in accordance with exemplary embodiments of the present invention. For example, the memory device 210 could be configured to buffer input data for processing by the processor 205. Additionally, or alternatively, the memory device 210 may be configured to store instructions for execution by the processor 205.

The communication interface 220 may be any device or means embodied in either hardware, software, or a combination of hardware and software that is configured to receive and/or transmit data from/to a network and/or any other device or module in communication with the apparatus 200. In this regard, the communication interface 220 may include, for example, an antenna, a transmitter, a receiver, a transceiver and/or supporting hardware, including a processor or software for enabling communications with network 225. Via the communication interface 220 and the network 225, the apparatus 200 may communicate with various other network entities. Messages received by the apparatus 200 via the communications interface 220 may be directed to a communications port. In this regard, applications executed by, for example, the processor 205 may open a port and receive messages at the port, if the messages are addressed to the port. The communications interface 220 may also be configured to send and receive SMS messages, and specially configured SMS messages, in accordance with exemplary embodiments of the present invention.

The communications interface 220 may be configured to provide for communications in accordance with any wired or wireless communication standard. For example, communications interface 220 may be configured to provide for communications in accordance with second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 220 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

The status manager 230 and message generator 232 of apparatus 200 may be any means or device embodied in hardware, software, or a combination of hardware and software, such as processor 205 implementing software instructions or a hardware configured processor 205, that is configured to carry out the functions of the status manager 230 and/or message generator 232 as described herein. In an exemplary embodiment, the processor 205 may include, or otherwise control the status manager 230 and/or message generator 232. In various exemplary embodiments, the status manager 230 and/or message generator 232 may reside on differing apparatuses such that some or all of the functionality of the status manager 230 and/or message generator 232 may be performed by a first apparatus, and the remainder of the functionality of the status manager 230 and/or message generator 232 may be performed by one or more other apparatuses.

The status manager 230 may be configured to receive status information of other devices configured to implement the service functionality. For example, the status manager 230 may be configured to receive status information indicating which members of a social group are currently online or offline. In some exemplary embodiments, the status manager 230 may receive the status information from a service, such as the service 300. The status manager 230 may also enable the user interface 215 to access the status information to generate content to be displayed, such as the content included in the screen shot of FIG. 2a. In some exemplary embodiments, the status manager 230 may communicate with the user interface 215 and allow generation of, for example, invite online messages only to devices that are currently offline.

The message generator 232 may be configured to generate a message based on application registration data associated with the device that is to receive the message. In this regard, the message generator 232 may be configured to verify that a receiving device is configured to properly receive the message by evaluating application registration data. The application registration data may be stored on, for example, the memory device 210 or on the service 300. The application registration data may comprise device identifiers, or other information indicating the configuration of an intended recipient of a message.

For example, the message generator 232 may be configured to search for a device identifier associated with an intended recipient to verify the configuration of an intended recipient. The device identifier may be a phone number, an MSISDN number, a JID, a IMEI, a BT MAC, a WLAN MAC, or the like. Message generator 232 may search through the data associated with members of a social group to locate the device identifier of the intended recipient. Searching for the device identifier may include searching the data stored on the memory device 210. If the message generator 232 can locate the device identifier of the intended recipient, then it may be assumed that the recipient is configured to receive the message. If the device identifier cannot be located, then it may be assumed that the intended recipient is not configured to receive the message, and a message need not be generated.

The message generator 232 may be configured to verify the configuration of an intended recipient in various other alternative manners. For example, the message generator 232 may be configured to query the service 300 regarding the configuration of an intended recipient, and the service 300 may transmit a configuration status back to the message generator 232.

Upon determining that an intended recipient is configured to receive the message, the message generator 232 may be configured to generate the message. The message may be generated as a specially configured SMS message. The message may include a port address, such as an SMS port address, where the message is to be received on the receiving device. The port associated with the port address may be a dedicated port for use by a client application of the service 300. Further, the message may include the device identifier of the sending device. Also, the content of the message may be determined based on the functionality or applications desired to be implemented on the receiving device (e.g., wakeup, nudge, poke, invite online, etc.).

Message generator 232 may also be configured to provide for transmitting the message. In this regard, the message generator 232 may be configured to provide for transmitting the message via the communications interface 220. In some exemplary embodiments, the message generator 232 may be configured to transmit the message to the recipient without routing the message through the service 300. In this regard, in embodiments where the message is an SMS message, the user of apparatus 200 may incur fees from a communications service provider for sending the SMS message, rather than the service 300.

The apparatus 400 of FIG. 3 may be configured to implement application-based communications according to various exemplary embodiments of the present invention. In particular, the apparatus 400 may be configured to receive a message and execute an application as described herein. In some exemplary embodiments, the apparatus 400 may be embodied as, or included as a component of, a communications device with wired or wireless communications capabilities. Some examples of the apparatus 400 may include a computer, a server, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the apparatus 400 may be configured to implement various aspects of the present invention as described herein including, for example, various exemplary methods of the present invention, where the methods may be implemented by means of a hardware or software configured processor, computer-readable medium, or the like.

The apparatus 400 may include or otherwise be in communication with a processor 405, a memory device 410, a user interface 415, and a communication interface 420. The processor 405 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. In an exemplary embodiment, the processor 405 may be configured to execute instructions stored in the memory device 410 or instructions otherwise accessible to the processor 405. Processor 405 may also be configured to facilitate communications via the communications interface 420 by, for example, controlling hardware and/or software included in the communications interface 420.

The memory device 410 may be a computer-readable storage medium that may include volatile and/or non-volatile memory. For example, memory device 410 may include Random Access Memory (RAM) including dynamic and/or static RAM, on-chip or off-chip cache memory, and/or the like. Further, memory device 410 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 410 may include a cache area for temporary storage of data. In this regard, some or all of memory device 410 may be included within the processor 405.

Further, the memory device 410 may be configured to store information, data, applications, computer-readable program code instructions, or the like for enabling the processor 405 and the apparatus 400 to carry out various functions in accordance with exemplary embodiments of the present invention. For example, the memory device 410 could be configured to buffer input data for processing by the processor 405. Additionally, or alternatively, the memory device 410 may be configured to store instructions for execution by the processor 405.

The user interface 415 may be in communication with the processor 405 to receive user input at the user interface 415 and/or to provide output to a user as, for example, audible, visual, mechanical or other output indications. The user interface 415 may include, for example, a keyboard, a mouse, a joystick, a display (e.g., a touch screen display), a microphone, a speaker, or other input/output mechanisms. In some exemplary embodiments, the user interface 415 may be limited, or even eliminated.

The communication interface 420 may be any device or means embodied in either hardware, software, or a combination of hardware and software that is configured to receive and/or transmit data from/to a network and/or any other device or module in communication with the apparatus 400. In this regard, the communication interface 420 may include, for example, an antenna, a transmitter, a receiver, a transceiver and/or supporting hardware, including a processor or software for enabling communications with network 425. The antenna may be configured to receive a message and provide for transferring the message to the processor 405. Via the communication interface 420 and the network 225, the apparatus 400 may communicate with various other network entities. Messages received by the apparatus 400 via the communications interface 420 may be directed to a communications port. In this regard, applications executed by, for example, the processor 405 may open a port and receive messages at the port, if the messages are addressed to the port. The communications interface 420 may also be configured to send and receive SMS messages, and specially configured SMS messages, in accordance with exemplary embodiments of the present invention.

The communications interface 420 may be configured to provide for communications in accordance with any wired or wireless communication standard. For example, communications interface 420 may be configured to provide for communications in accordance with second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 220 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

The message receiver 430 and the application manager 432 of apparatus 400 may be any means or device embodied in hardware, software, or a combination of hardware and software, such as processor 405 implementing software instructions or a hardware configured processor 405, that is configured to carry out the functions of the message receiver 430 and/or application manager 432 as described herein. In an exemplary embodiment, the processor 405 may include, or otherwise control the status manager 230 and/or message generator 232. In various exemplary embodiments, the status manager 230 and/or message generator 232 may reside on differing apparatuses such that some or all of the functionality of the message receiver 430 and/or application manager 432 may be performed by a first apparatus, and the remainder of the functionality of the message receiver 430 and/or application manager 432 may be performed by one or more other apparatuses.

The message receiver 430 may be configured to receive a message from a remote device (e.g., the apparatus 200) at a receiving device (e.g., the apparatus 400). In this regard, the message may have been generated based on application registration data associated with the receiving device as described above. Further, the message receiver 430 may be configured to receive the message as an SMS message. In some exemplary embodiments, the SMS message may have been specially configured for use with a client application of the service 300.

The message receiver 430 may also be configured to evaluate the message and identify the content of the message. In some exemplary embodiments, the message may include a port address where the message is to be received. Use of the port associated with the port address may be dedicated to a client application associated with the service 300. In exemplary embodiments where the message is a SMS message, the message may be received at the dedicated port and therefore the message need not be displayed in an SMS inbox.

The application manager 432 may be configured to verify an identity of the sending device by comparing a device identifier (e.g., a phone number, a MSISDN number, a JID, a IMEI, a BT MAC, a WLAN MAC, and/or the like) within the message with a device identifier stored in a memory device of the receiving device. In this regard, the apparatus 400 may have a collection of device identifiers stored in association with, for example, a social group. The application manager 432 may be configured to search through the collection of device identifiers and locate a device identifier that matches the device identifier of the sending device. If a match is located, the legitimacy of the message may be confirmed. If a match is not located the message may be considered nefarious and ignored and/or discarded. As such, verifying the identity of the sending device may perform a security or anti-spam function.

The application manager 432 may also be configured to execute an application or functionality associated with an application based on the content included within the message. In some exemplary embodiments, the executed application may be functionality of a higher level application, such as a sub-application or a supplemental process. As described above, the message may be evaluated and instructions for execution may be identified. Based on the instructions, and possibly predefined user preferences, applications or functionality associated with an application may be executed automatically, or after being acknowledged by a user. For example, the message may include instructions to, automatically or after an acknowledgement, log on a user that is currently offline. In this regard, in some exemplary embodiments, a specially configured SMS may be received and the application manager 432 may respond by opening a data connection, such as an IP-based data connection. Other exemplary functionality to be executed may include providing a context update, executing a multiplayer game, opening a chat session, alerting a user visually or audibly, etc.

Figure 4:
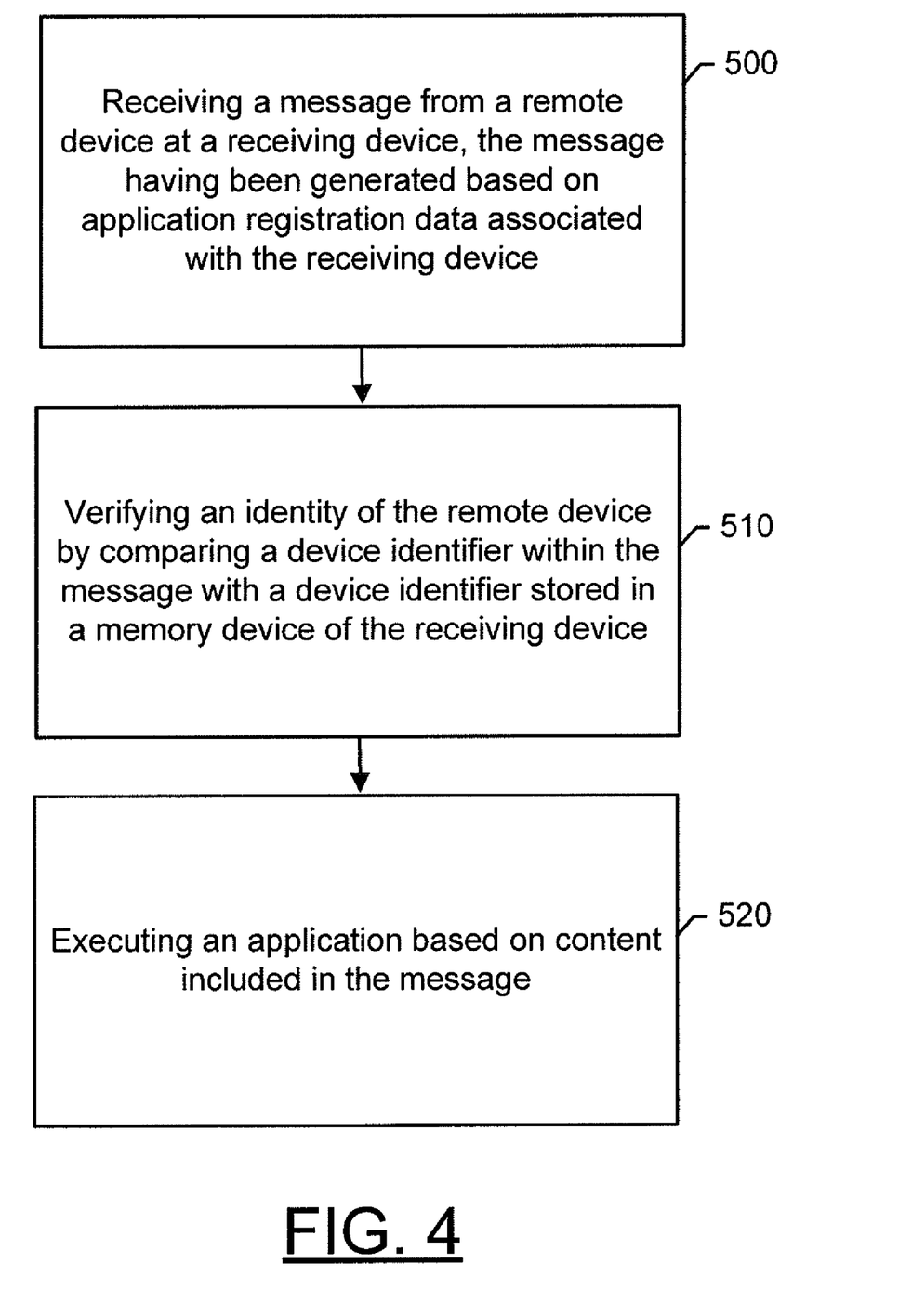
FIG. 4 is a flowchart of a method for implementing application-based communications according to various exemplary embodiments of the present invention.

FIG. 4 illustrates a flowchart of a system, method, and computer program product according to exemplary embodiments of the invention. It will be understood that each block, step, or operation of the flowchart, and/or combinations of blocks, steps, or operations in the flowchart, can be implemented by various means. Means for implementing the blocks, steps, or operations of the flowchart, and/or combinations of the blocks, steps or operations in the flowcharts may include hardware, firmware, and/or software including one or more computer program code instructions, program instructions, or executable computer-readable program code instructions. In one exemplary embodiment, one or more of the procedures described herein may be embodied by program code instructions. In this regard, the program code instructions which embody the procedures described herein may be stored by or on a memory device, such as memory device 210 or 410, of an apparatus, such as apparatus 200 or 400, and executed by a processor, such as the processor 205 or 405. As will be appreciated, any such program code instructions may be loaded onto a computer or other programmable apparatus (e.g., processor 205 or 405, memory device 210 or 410) to produce a machine, such that the instructions which execute on the computer or other programmable apparatus create means for implementing the functions specified in the flowchart's block(s), step(s), or operation(s). These program code instructions may also be stored in a computer-readable storage medium that can direct a computer, a processor, or other programmable apparatus to function in a particular manner, such that the instructions stored in the computer-readable storage medium produce an article of manufacture including instruction means which implement the function specified in the flowchart's block(s), step(s), or operation(s). The program code instructions may also be loaded onto a computer, processor, or other programmable apparatus to cause a series of operational steps to be performed on or by the computer, processor, or other programmable apparatus to produce a computer-implemented process such that the instructions which execute on the computer, processor, or other programmable apparatus provide steps for implementing the functions specified in the flowcharts' block(s), step(s), or operation(s).

Accordingly, blocks, steps, or operations of the flowchart support combinations of means for performing the specified functions, combinations of steps for performing the specified functions, and program code instruction means for performing the specified functions. It will also be understood that one or more blocks, steps, or operations of the flowchart, and combinations of blocks, steps, or operations in the flowchart, can be implemented by special purpose hardware-based computer systems which perform the specified functions or steps, or combinations of special purpose hardware and program code instructions.

FIG. 4 depicts a flowchart describing an exemplary method of the present invention. The exemplary method may include receiving a message from a remote device at a receiving device at 500. The message may have been generated based on application registration data associated with the receiving device. In this regard, in some exemplary embodiments, the application registration data may reside in a memory device of the remote device. Further, in some exemplary embodiments, the message may be received as an SMS message or a specially configured SMS message.

Additionally or alternatively, in some exemplary embodiments, receiving the message may include receiving the message in a dedicated port, such as a dedicated SMS port. In this regard, the port may be dedicated to an application (e.g., a client application associated with a service).

In some exemplary embodiments, the method may also include verifying an identity of the remote device at 510. The identity of the remote device may be verified by comparing a device identifier within the message with a device identifier stored in a memory device of the receiving device. In this regard, the device identifiers may be a phone number, an MSISDN number, a JID, a IMEI, a BT MAC, a WLAN MAC, or the like.

Further, the method may also include executing an application at 520. The application may be executed based on content included in the message. In some exemplary embodiments, the application may be automatically executed, or an acknowledgement from a user may be required before execution of the application may proceed. In some exemplary embodiments, the application to be executed may open a data connection, such as an IP-based data connection.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
receiving a message from a remote device at a receiving device, the message having been generated based on application registration data associated with the receiving device;
verifying an identity of the remote device by comparing a device identifier within the message with a device identifier stored by the receiving device; and
executing an application based on content included in the message.

2. The method of claim 1, wherein receiving the message includes receiving the message as a short message service message.

3. The method of claim 2, wherein receiving the message includes receiving the message that has been generated based on the application registration data residing in a memory device of the remote device.

4. The method of claim 2, wherein receiving the message includes receiving the message in an short message service port dedicated to the application.

5. The method of claim 1, wherein verifying the identity of the remote device includes comparing a mobile subscriber integrated services digital network number within the message with a mobile subscriber integrated services digital network number stored by the receiving device.

6. The method of claim 1, wherein verifying the identity of the remote device includes comparing a mobile subscriber integrated services digital network number and a jabber identification within the message with a mobile subscriber integrated services digital network number and respective jabber identification stored by the receiving device.

7. An apparatus comprising:
at least one processor; and
at least one memory including computer program code for one or more programs,
the at least one memory and the computer program code configured to, with the at least one processor, cause the apparatus to perform at least the following,
receive a message from a remote device, the message having been generated based on application registration data associated with a receiving device;
verify an identity of the remote device by comparing a device identifier within the message with a device identifier stored in a memory device of the receiving device; and
execute an application based on content included in the message.

8. The apparatus of claim 7, wherein receiving the message includes receiving the message as a short message service message.

9. The apparatus of claim 8, wherein receiving the message includes receiving the message that has been generated based on the application registration data residing in a memory device of the remote device.

10. The apparatus of claim 8, wherein receiving the message includes receiving the message in a short message service port dedicated to the application.

11. The apparatus of claim 7, wherein verifying the identity of the remote device includes comparing a mobile subscriber integrated services digital network number within the message with a mobile subscriber integrated services digital network number stored in a memory device of the receiving device.

12. The apparatus of claim 7, wherein verifying the identity of the remote device includes comparing a mobile subscriber integrated services digital network number and a jabber identification within the message with a mobile subscriber integrated services digital network number and respective jabber identification stored in a memory device of the receiving device.

13. A computer-readable storage medium carrying one or more sequences of one or more instructions which, when executed by one or more processors, cause an apparatus to at least perform the following steps:

receiving a message from a remote device at a receiving device, the message having been generated based on application registration data associated with the receiving device;

verifying an identity of the remote device by comparing a device identifier within the message with a device identifier stored in a memory device of the receiving device; and     executing an application based on content included in the message.

14. The computer-readable storage medium of claim 13, wherein the message is a short message service message.

15. The computer-readable storage medium of claim 14, wherein the message is generated based on the application registration data residing in a memory device of the remote device.

16. The computer-readable storage medium of claim 14, wherein the message is received in a short message service port dedicated to the application.

17. The computer-readable storage medium of claim 13, wherein verifying the identity of the remote device includes comparing a mobile subscriber integrated services digital network number within the message with a mobile subscriber integrated services digital network number stored in a memory device of the receiving device.

18. The computer-readable storage medium of claim 13, wherein verifying the identity of the remote device includes comparing a mobile subscriber integrated services digital network number and a jabber identification within the message with a mobile subscriber integrated services digital network number and a respective jabber identification stored in a memory device of the receiving device.

19. An apparatus comprising:

means for receiving a message from a remote device at a receiving device, the message having been generated based on application registration data associated with the receiving device;

means for verifying an identity of the remote device by comparing a device identifier within the message with a device identifier stored in a memory device of the receiving device; and     means for executing an application based on content included in the message.

20. The apparatus of claim 19, wherein the means for receiving the message includes means for receiving the message as a short message service message.

\* \* \* \* \*